(12) United States Patent
Wei et al.

(10) Patent No.: US 7,952,291 B2
(45) Date of Patent: May 31, 2011

(54) DISCHARGE LAMP HAVING A VISUAL-CHANGE TIMER

(75) Inventors: George C. Wei, Weston, MA (US); Peter Niedermeier, Munich (DE)

(73) Assignee: Osram Sylvania Inc., Danvers, MA (US)

( * ) Notice: Subject to any disclaimer, the term of this patent is extended or adjusted under 35 U.S.C. 154(b) by 768 days.

(21) Appl. No.: 11/686,709

(22) Filed: Mar. 15, 2007

(65) Prior Publication Data

US 2008/0224618 A1    Sep. 18, 2008

(51) Int. Cl.
*H01J 7/42* (2006.01)

(52) U.S. Cl. ............ 315/134; 313/634; 374/162

(58) Field of Classification Search ............ 315/134; 374/162, E3.004, 102; 313/623–625, 634–636, 313/318.12, 484–493, 570–576; 188/50; 425/26, 27
See application file for complete search history.

(56) References Cited

U.S. PATENT DOCUMENTS

| | | | |
|---|---|---|---|
| 5,588,992 A * | 12/1996 | Scott et al. | 117/2 |
| 5,859,496 A | 1/1999 | Murazaki et al. | |
| 6,784,601 B2 * | 8/2004 | Kai et al. | 313/46 |
| 6,798,139 B2 * | 9/2004 | Ramaiah et al. | 313/634 |
| 6,974,249 B1 * | 12/2005 | Fair et al. | 374/102 |
| 2003/0025455 A1 * | 2/2003 | Alderman et al. | 313/634 |
| 2003/0052605 A1 * | 3/2003 | Hecker et al. | 313/623 |
| 2003/0127985 A1 * | 7/2003 | Okamoto et al. | 313/594 |
| 2005/0258762 A1 * | 11/2005 | Beland et al. | 313/635 |

FOREIGN PATENT DOCUMENTS

EP    1681334 A1    7/2006

OTHER PUBLICATIONS

L. Brock et al., "Color centers in magnesium-doped polycrystalline alumina," Proc. MRS Symposium, Materials Research Society (2001).
K.P.D. Lagerlöf et al., "The defect chemistry of sapphire (a-Al2O3)," Acta. Mater. 46 5689 (1998).
S.K. Mohapatra et al., "Defect structure of a-Al2O3 doped with magnesium," J. Am. Cer. Soc. 60 141 (1977).
K. Kitazawa et al., "Chemical diffusion in polycrystalline alumina as determined from electrical conductivity measurements," J. Am. Cer. Soc. 57 [6] 250 (1974).
H.A. Wang et al., "Chemical diffusion in polycrystalline alumina," J. Am. Cer. Soc. 63 [11-12] 613 (1980).
T. Jones et al., "Defect diffusion in single crystal alumina," J. Am. Cer. Soc. 52 [6] 331 (1969).
Excerpt, K. Nassau, The physics and chemistry of color: the fifteen causes of color, Wiley NY (1983).
Excerpt, Y. Chiang et a., Physical ceramics, Wiley, NY (1997).
G. Derra et al., "UHP lamp systems for projection applications," J. Phys. D. Appl. Phys. 38 2995 (2005).
M. Kase et al., "Characteristics of sealed parts under internal pressure in super high-pressure mercury discharge lamps," Cer. Eng. Sci. Proc. 26 [2], p. 157-164 (2005).

* cited by examiner

*Primary Examiner* — Nimeshkumar D Patel
*Assistant Examiner* — Christopher Raabe
(74) *Attorney, Agent, or Firm* — Robert F. Clark

(57) ABSTRACT

A discharge lamp having a visual-change timer is described. The visual-change timer is comprised of a ceramic material that provides an indication of the cumulative operating time of the lamp. The visual-change timer is expected be a help to consumers in avoiding unnecessary, premature, and costly lamp replacement and a help to lamp manufacturers in verifying the validity of warranty claims for replacement lamps.

9 Claims, 2 Drawing Sheets

DISCHARGE LAMP HAVING A VISUAL-CHANGE TIMER

BACKGROUND OF THE INVENTION

High intensity discharge (HID) lamps are used in a variety of general purpose and specialty lighting applications. Included in this category of lamps are high-pressure sodium lamps, mercury vapor lamps, rare gas discharge lamps, and metal halide lamps. One specialized application for HID lamps is video projection including projection-type televisions. These lamps are generally expensive, costing on the order of hundreds of dollars, and consequently are sold to customers with a warranty for a guaranteed minimum operating life. Replacements for lamps that are returned to the manufacturer because they did not meet their guaranteed lifetime can represent a significant cost. At present, there is no reliable means for the manufacturer to evaluate the propriety of such warranty claims. For example, production date marking is insufficient to determine the actual operating life of a lamp because of unknown storage times at the wholesaler, retailer, or end user.

Some industries have developed visual-change timers to indicate an end-of-life condition for their products. For example, organic-based, color-change timers have been widely used in the containers or wrappings of perishable agricultural products to serve as a warning that the product is past its expiration date. Commercially available color timers used in connection with foodstuffs however are limited to functioning at temperatures less than about 60° C. This is much lower than the operating temperatures generated in an operating HID lamp. Moreover, an HID lamp will operate for hundreds or, even more likely, thousands of hours at these high temperatures. Hence, a color-change timer for an HID lamp would have to function for long periods of time at conditions that would decompose most organic materials. It would therefore be advantageous to provide a high-temperature, visual-change timer that could be used with HID lamps to provide an indication of the cumulative operating time or an end-of-life condition.

SUMMARY OF THE INVENTION

It is an object of the invention to obviate the disadvantages of the prior art.

It is a another object of the invention to provide a visual-change timer that provides an indication of the cumulative time of exposure to a high temperature.

It is further object of the invention to provide a discharge lamp that has a visual-change timer which provides an indication of the cumulative operating time of the lamp.

In accordance with an object of the invention, there is provided a discharge lamp that has a discharge vessel mounted in a lamp enclosure. The discharge vessel contains a discharge medium and has electrodes for generating an arc discharge. A visual-change timer is positioned on a surface of the lamp whereby the visual-change timer is heated to a predetermined temperature when the lamp is operating. The visual-change timer comprises a ceramic material which exhibits a visual change that provides an indication of a cumulative operating time of the lamp.

In accordance with another object of the invention, there is provided a visual-change timer that comprises a piece of polycrystalline alumina containing from 40 ppm to 1000 ppm MgO. The polycrystalline alumina has been sintered for 1 to 5 hours at 1800° C. to 1950° C. in wet hydrogen with a dew point of from 0° C. to 23° C. and provides an indication of a cumulative time of exposure to a temperature in a range from about 200° C. to about 1250° C.

Although visual-change timers offer a potentially greater benefit when used in video projection applications because of the large expense associated with replacement lamps, the visual-change timers may also be used in other HID lamps such a ceramic metal halide lamps. Several applications and embodiments are discussed in more detail below. As used herein, a visual change means a change in the color or intensity of an object or light source which is perceivable by an unaided human eye.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 2:
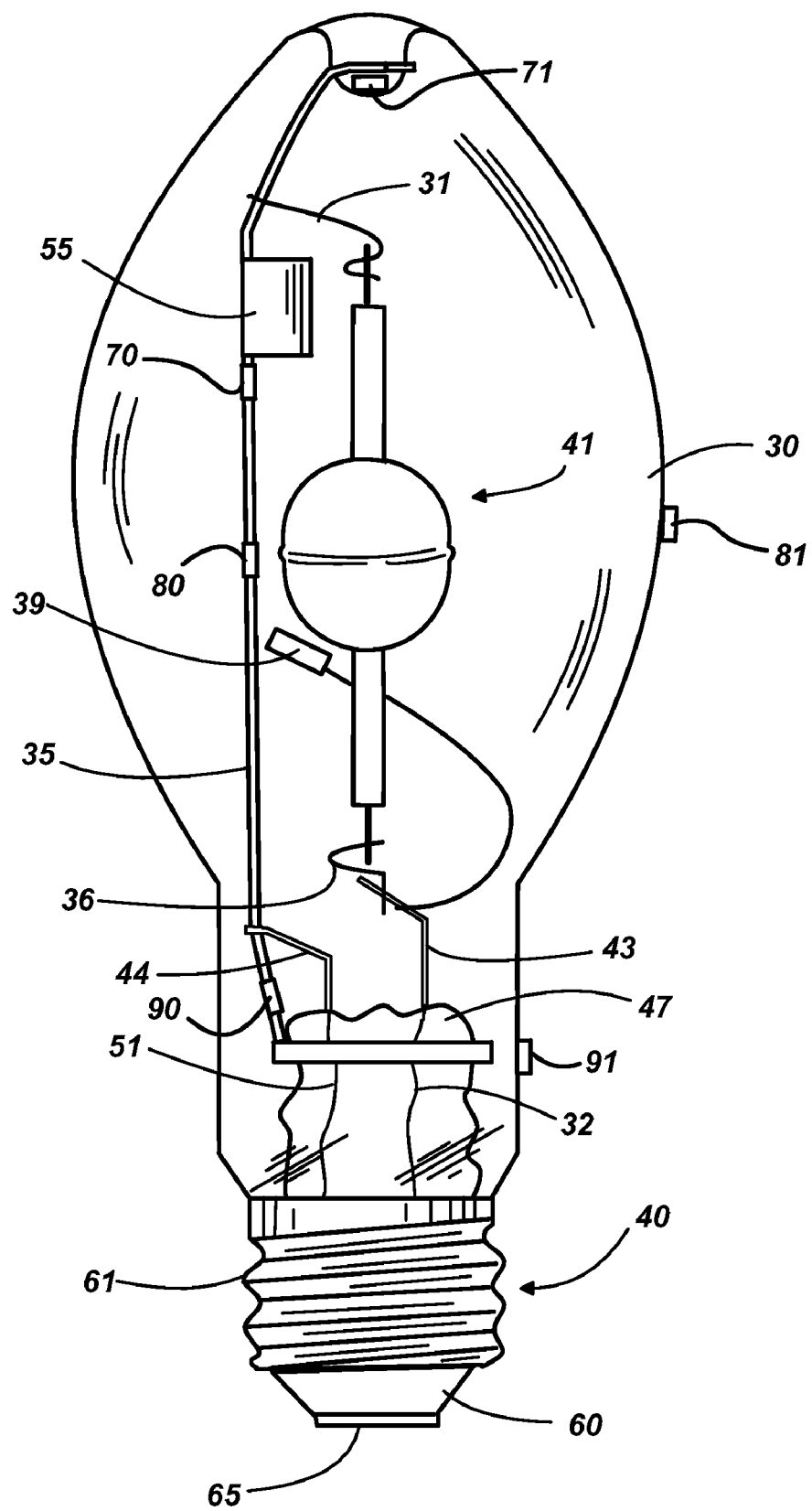
FIG. 2 is an illustration of a ceramic metal halide lamp according to another embodiment of this invention.

Polycrystalline alumina (PCA) is a common ceramic material used in HID lamps for forming the discharge vessels of metal halide and high-pressure sodium lamps, e.g., discharge vessel 41 of FIG. 2. Generally, it is desirable when used for discharge vessel applications that the PCA be colorless and translucent in order to maximize light output. However, PCA will exhibit a visible change in color when heated under certain conditions. The intensity and hue of the color change are dependent on the temperature to which the PCA is heated, the duration of the heat treatment, and the atmosphere in which the heat treatment is carried out, e.g., colorless, translucent PCA will turn a strong brown color after heating to 1000° C. for 2 hours in pure oxygen. The color change is related to the interplay of oxygen interstitials and vacancies with associated holes and electrons as a function of the partial pressure of oxygen. More particularly, colorless MgO-doped PCA (40-1000 ppm MgO) that has been sintered in wet hydrogen (dew point=0-23° C.) at 1800-1950° C. for 1-5 hours changes to a dark brown color after heating in pure $O_2$, a pink-brown color after heating in air, and a milky white after heating in a vacuum or an inert gas. The colors can be switched back and forth by annealing the colored PCA at high temperatures under appropriate atmospheres. At temperatures above 1650° C., the kinetics which depend on the diffusion of oxygen point defects (vacancies and interstitials) is fast and the color change is completed in less than 5 minutes. At lower temperatures such as the range of temperatures associated with HID lamps (other than the immediate vicinity of the discharge vessel) and their various components (about 200° C. to about 1200° C.), the chemical diffusion is much slower. This permits the use of PCA as a visual-change timer for measuring the operating lifetimes of HID lamps. Once the parameters of the color change are established, it would then be possible to design one or more visible-change timers that could be placed at specific predetermined locations in an HID lamp system to provide a reasonable indication of the actual cumulative operating time of the lamp. A specific example is provided below.

The chemical diffusion coefficient (D) of oxygen point defects in MgO-doped alumina may be represented by the Equation (1) below.

$$D=2.0\times10^{-2} \exp[-19 \text{ kcal/mole}/(RT)] \text{cm}^2/\text{s} \quad (1)$$

At 1000° C., the value of D is $1.09\times10^{-5}$ cm$^2$/s. At 400° C., D is $1.35\times10^{-8}$ cm$^2$/s. From these values it is possible according to Equation 2 to estimate the diffusion thickness (x) required for a predetermined time, t.

$$x^2=4Dt \quad (2)$$

Thus, for a 1-mm-thick piece of colored-PCA, the color change to white would appear to be visually complete in about 4 minutes at 1000° C., and in about 700 hours at 400° C. To make a timer wherein the visual color change occurs after 1000 hours at 400° C., the thickness should be about 1.2 mm.

With this information, it is now possible to design a visual-change timer which will indicate a 1000-hour operating time. For example, a 1.2-mm-thick piece of dark-brown-colored PCA should turn white after 1000 hours of lamp operation, if it is placed in a vacuum environment (with a small, but finite $P_{O2}$; $1\times10^{-11}$ to $1\times10^{-22}$ atm) and at a location in the lamp where it will reach about 400° C. during the operation of the lamp. Such a condition may exist for example inside the outer envelope of a metal halide HID lamp or on the exterior of its discharge vessel. Alternatively, a similarly sized piece of white PCA placed at a 400° C. location on the outside of the reflector of an HID video projection lamp, operating in air, should turn to a pink-brown color after the lamp has burned for 1000 hours.

Other instances of potentially useable color changes in alumina ceramics include (1) color boundary migration (pink to colorless for a reducing to oxidizing atmosphere change) in Ti-doped alumina, and (2) oxidation state changes of the dopant ions in alumina doped with Ti and Fe (blue color), Ce (yellow), V (purple), or Mn (dark). In addition, other ceramic hosts doped with multi-valent ions such as Ce/Eu/Nd-doped YAG; Eu/Er—Yb/Ce doped $Y_2O_3$, Y/Mg/Ce/V-doped $ZrO_2$, Mn-doped $MgAl_2O_4$ spinel, and Ti/V/Mn/Er-doped MgO, can provide color changes. As each case will involve a different diffusivity, the visual-change timer may be designed in a manner similar to Equations (1) and (2) after the kinetic parameters have been established.

A different type of visual-change timer may be constructed from a luminescent ceramic material such as a long-afterglow aluminate phosphor. These long-afterglow phosphors exhibit a visible glow for several minutes to several hours after the source of excitation (typically visible and/or UV light) is removed. The Eu-activator used in these phosphors is known to degrade (i.e., the Eu$^{+2}$ activator oxidizes to Eu$^{+3}$) when heated in air thereby causing the level of luminescence to decrease. Once the time rate of decay of the luminescence is known as a function of temperature, such a material may serve as a visual-change timer in HID lamps.

In particular, for a Eu,Dy-activated strontium aluminate ($SrAl_2O_4$ or $Sr_4Al_{14}O_{25}$) phosphor, the intensity of the blue, or green, luminescence remained at about the same level after heating for 10 hours at 400° C. in air. The intensity appeared to decrease slightly after heating for 10 hours at 600° C. in air, and was no longer visible after heating for 10 hours at 1200° C. in air. This demonstrates that, provided with an appropriate temperature in air, the afterglow phosphor may function as a visual-change timer. For example, a spot of the blue-afterglow Eu,Dy strontium aluminate phosphor may be coated at a location of ~400° C. on the exterior surface of the reflector of an HID video projection lamp. The spot would initially exhibit the strong blue-afterglow, but degrade to a point where the afterglow is invisible after 1000 hours of operation.

In another embodiment, an air-fired afterglow phosphor having no visible afterglow may be placed in a low $P_{O2}$ environment such as inside the outer envelope of a metal halide lamp. After a desired operating time, the afterglow is restored to the phosphor thereby providing a visible indication that the desired operating time has been reached.

Figure 1:
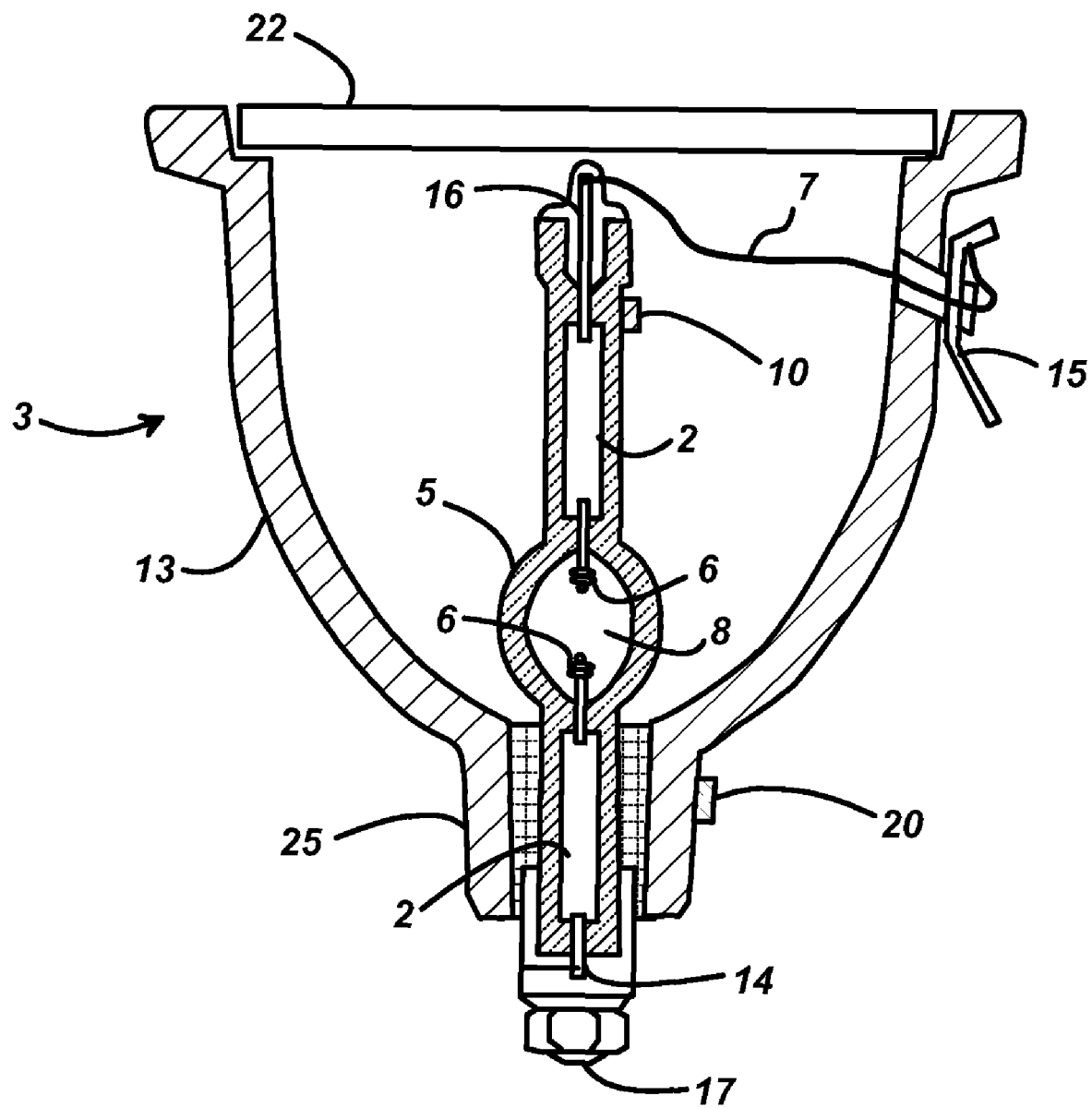
FIG. 1 is a cross-sectional illustration of an HID lamp for a video projection application according to one embodiment of this invention.

FIG. 1 is a cross-sectional illustration of an HID lamp for a video projection application. The quartz glass discharge vessel 5 encloses discharge cavity 8 that contains electrodes 6 and a discharge medium which is typically high pressure xenon gas or mercury vapor. For example, short-arc mercury discharge lamps contain a predetermined amount of mercury and a small amount of argon gas (~100 mbar). The amount of mercury is selected to yield about 200 bars of mercury vapor pressure during lamp operation. In short-arc xenon lamps, the lamps contain up to 20 bars of xenon gas. The high-pressure mercury lamps are used for normal video projection systems, whereas the xenon-filled lamps are preferred for cinema applications.

Referring again to FIG. 1, the electrodes 6 are connected to metal foils 2 which are hermetically sealed to the quartz glass. The metal foils 2 connect to leadwires 14, 16 which bring electric power to the discharge vessel. The discharge vessel 5 is contained in an enclosure 3 which is comprised of reflector 13 and transparent window 22. In the case of the projection lamp shown in FIG. 1, the enclosure 3 is open to the air by means of the small hole in the side of the reflector which allows wire 7 to be connected to external electrical connector 15. In other configurations, the reflector has slots close to the window 22 which permit forced air cooling of the lamp.

The discharge vessel 5 is cemented at one end in base 25 of reflector 13. Base 25 has mounting stud 17 which is electrically connected to leadwire 14. At the opposite end of the discharge vessel, leadwire 16 is connected through the side of the reflector 13 to an external electrical connector 15 by wire 7. Possible locations for the visible-change timer in this lamp configuration include, but are not limited to, inside enclosure 3 on the free end 10 of the discharge vessel 5 or on the outside of the reflector base 25 at position 20.

FIG. 2 is an illustration of a ceramic metal halide lamp. The ceramic discharge vessel 41 contains a discharge medium which is typically a buffer gas of Xe or Ar in combination with a small amount of mercury and a mixture of metal halide salts. The discharge vessel 41 is connected at one end to leadwire 31 which is attached to frame 35 and at the other end to leadwire 36 which is attached to mounting post 43. Electric power is supplied to the lamp through screw base 40. The threaded portion 61 of screw base 40 is electrically connected to frame 35 through leadwire 51 which is connected to a second mounting post 44. Base contact 65 of screw base 40 is electrically isolated from the threaded portion 61 by insulator 60. Leadwire 32 provides an electrical connection between the base contact 65 and the mounting post 43. A UV-generating starting aid 39 is connected to mounting post 43. Leadwires 51 and 32 pass through and are sealed within glass stem 47. A glass outer envelope 30 encloses the discharge vessel and its associated components and is sealed to stem 47 to provide a gas-tight environment. Typically, the outer envelope is evacuated, although in some cases it may contain up to 400 torr of nitrogen gas. A getter strip 55 is used to reduce contamination of the envelope environment. Possible locations for the visible-change timer are on the frame 35 at positions 70, 80, and 90 or on the outer glass envelope at positions 71, 81, and 91.

The visual-change timers of this invention should be a help to consumers as an effective guard against potential inaccurate records or recollections regarding a lamp's operating time which might ordinarily result in an unnecessary, premature, and costly replacement. Such visual-change timers should also be of help to lamp manufacturers in verifying the validity of warranty claims for replacement lamps.

While there have been shown and described what are presently considered to be the preferred embodiments of the invention, it will be apparent to those skilled in the art that various changes and modifications can be made herein without departing from the scope of the invention as defined by the appended claims.

We claim:

1. A discharge lamp, comprising: a discharge vessel mounted in a lamp enclosure, the discharge vessel containing a discharge medium and having electrodes for generating an arc discharge; and
   a visual-change timer positioned on a surface of the lamp, the visual-change timer being heated to a predetermined temperature when the lamp is operating, the visual-change timer comprising a piece of polycrystalline alumina containing at least one of oxygen point defects or a dopant, the polycrystalline alumina exhibiting a visual change in response to being heated to the predetermined temperature that provides an indication of a cumulative operating time of the lamp.

2. The discharge lamp of claim 1 wherein the predetermined temperature is from about 200° C. to about 1250° C.

3. The discharge lamp of claim 1 wherein the predetermined temperature is from about 400° C. to about 600° C.

4. The discharge lamp of claim 1 wherein the visual-change timer is positioned within the lamp enclosure.

5. The discharge lamp of claim 1 wherein the piece of polycrystalline alumina is doped with MgO and has a brown or pink-brown color.

6. The discharge lamp of claim 1, wherein the piece of polycrystalline alumina contains from 40 ppm to 1000 ppm MgO and has been sintered for 1 to 5 hours at 1800° C. to 1950° C. in wet hydrogen with a dew point of from 0° C. to 23° C.

7. The discharge lamp of claim 1, wherein the enclosure comprises a transparent window and a reflector having a base, and the visual-change timer is positioned on the base.

8. The discharge lamp of claim 1, wherein the enclosure comprises a glass envelope containing a vacuum or inert gas and the visual-change timer is located inside the enclosure.

9. The discharge lamp of claim 1 wherein the dopant is selected from Ti, Fe, Ce, V or Mn.

* * * * *